INVENTOR.
Sam Tarantur
BY Donald W. Phillion
HIS ATTORNEY

INVENTOR.
Sam Tarantur
BY Donald W. Phillion
HIS ATTORNEY

INVENTOR.
Sam Tarantur
BY Donald W. Phillion
HIS ATTORNEY 2,846,578
Patented Aug. 5, 1958

2,846,578

DEMODULATOR

Sam Tarantur, River Grove, Ill., assignor to Admiral Corporation, Chicago, Ill., a corporation of Delaware Application February 20, 1956, Serial No. 566,601
16 Claims. (Cl. 250—27)

Figure 1:
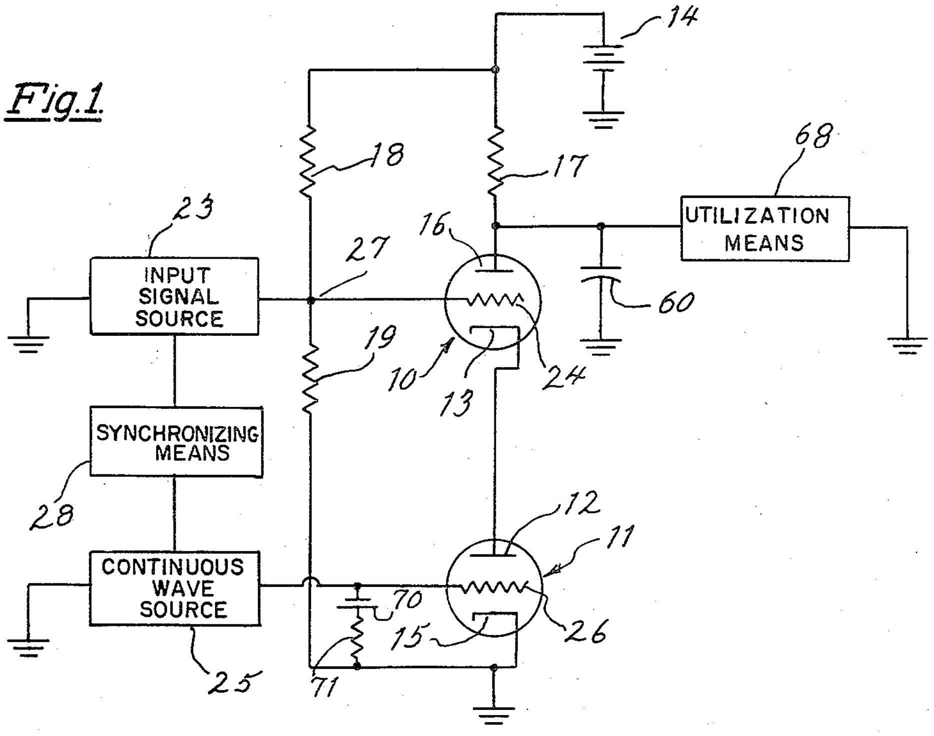

This invention relates generally to synchronous detectors, and more particularly to synchronous detectors employing triodes.

In the prior art, both triodes and pentodes commonly have been utilized in the design of synchronous detectors. In the case of pentodes, an information-bearing amplitude modulated signal is supplied to the control grid thereof, and a continuous wave having the same frequency and phase as the carrier signal of the amplitude modulated signal is supplied to the suppressor grid. The circuit constants are so selected and the continuous wave has such an amplitude that when the continuous wave has a negative excursion the plate current of the pentode will be cut off, and when the continuous wave has a positive excursion the said pentode will be caused to be in a conductive state. Thus, during positive excursions of the continuous wave, the pentode will be in condition to respond to the input signal supplied to the control grid to produce an output signal having a substantially corresponding waveform. Consequently, an output signal consisting of a series of unilateral pulses is produced in the output circuit of the pentode.

A pentode, however, presents a high source impedance to a load connected thereto. In applications where the load to be supplied is of relatively low impedance, this characteristic of a pentode is undesirable because of the resulting mismatch of impedances. In such applications it would be desirable to employ a synchronous detector having a lower, more evenly matched source impedance, such as could be obtained, for example, through the use of triodes. Further, the expense of a pentode is greater than the expense of two triodes, which are employed in the present invention, and which perform the same general function as a single pentode.

Although synchronous detectors employing triodes and having relatively low output impedances are known in the prior art, there are certain difficulties present therein. Specifically, such synchronous detectors utilize a single triode in which the modulated signal may be supplied to the control grid thereof and the continuous wave to the cathode thereof. Considerable interaction between these two signals occurs with resulting distortion in the detected signal.

An object of the present invention is to provide a synchronous detector having a relatively low output impedance and relatively low distortion in the output signal.

A further object of the invention is to provide a relatively inexpensive synchronous detector.

A third object of the invention is the improvement of synchronous detectors, generally.

In accordance with the invention, two electronic valves, such as triodes, are connected in series-arrangement with the anode of one of the triodes being connected to the cathode of the other of the two triodes. A plate potential supply and a utilization means are connected across the two triodes. The information-bearing amplitude modulated signal is suppled to the control grid of a first of the triodes and the continuous wave is supplied to the control grid of the second of the triodes which functions as an electronic switch for said first triode. The circuit constants are so selected that the negative excursions of the continuous wave will cut off completely the plate current of the second triode and the positive excursions of the continuous wave will drive the potential of the control grid of the second triode well above cut-off value and preferably well above cathode potential, assuming that grid current did not occur to prevent such a happening. The system will also function satisfactorily if the information-bearing signal is supplied to the control grid of the second triode and the continuous wave is supplied to the control grid of the first triode.

In accordance with a feature of the invention, types of electronic valves other than triodes may be utilized. For example, transistors may be employed in lieu of the triodes.

Figure 9:
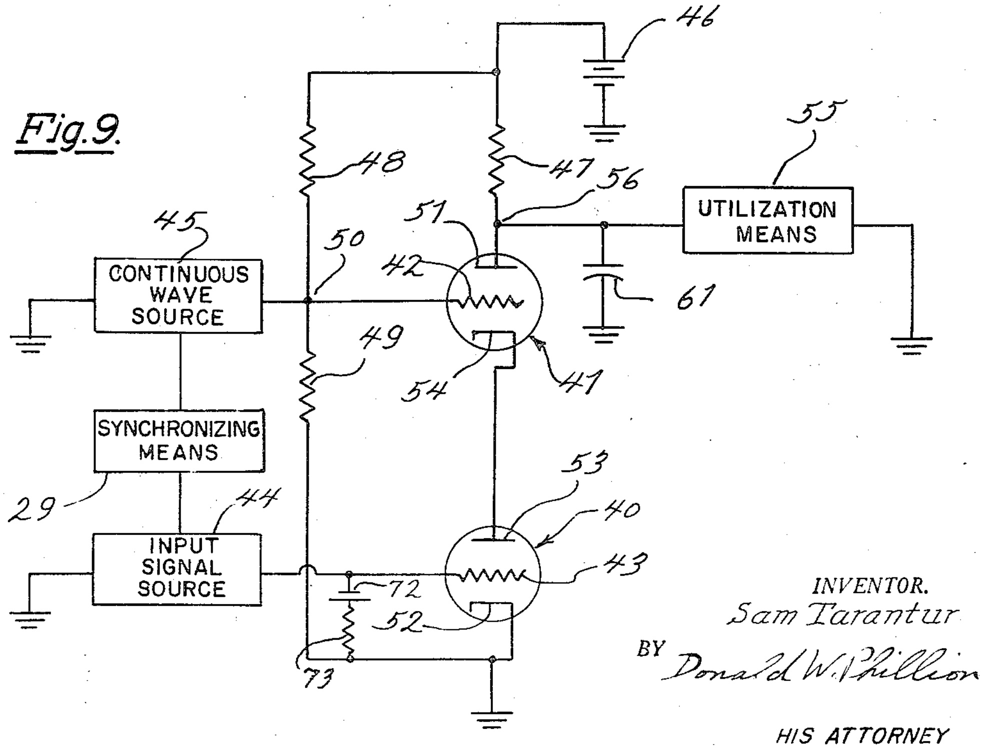
Figures 2, 3, 4:
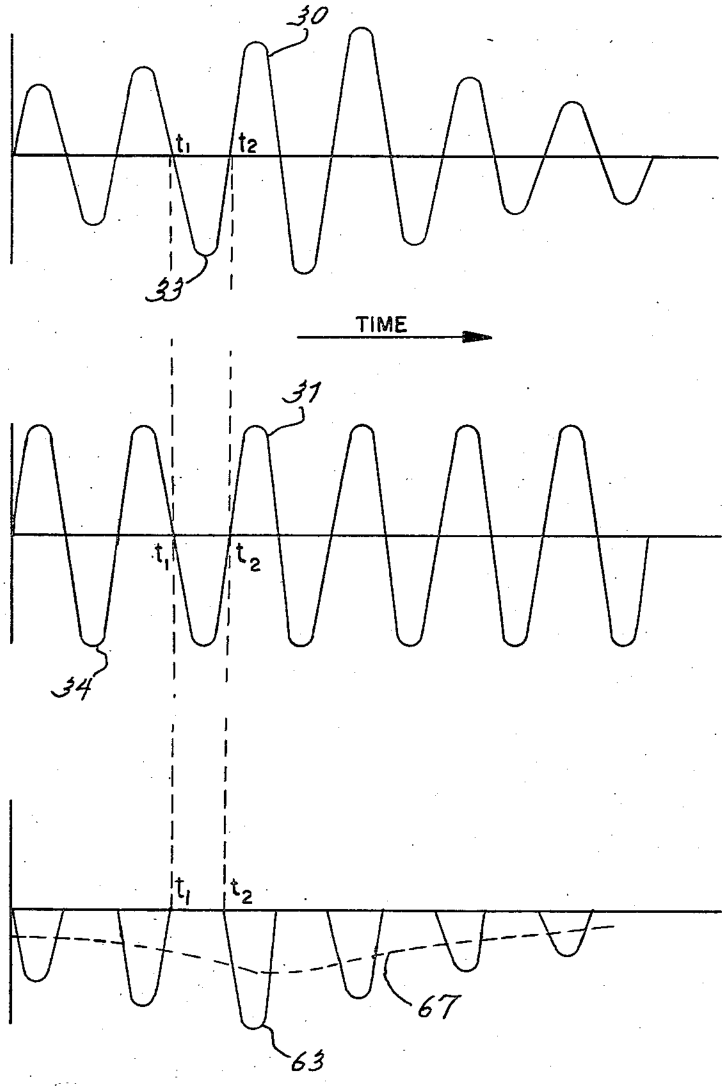
Figures 5, 6, 7:
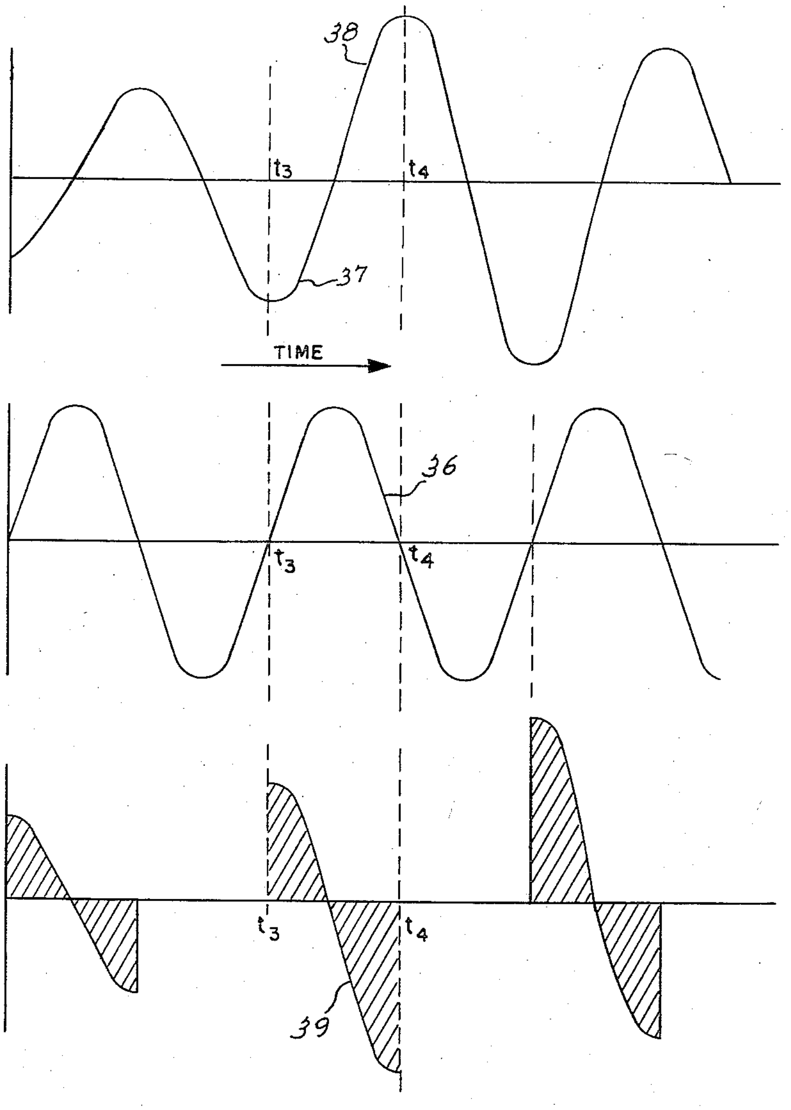
Figure 8:
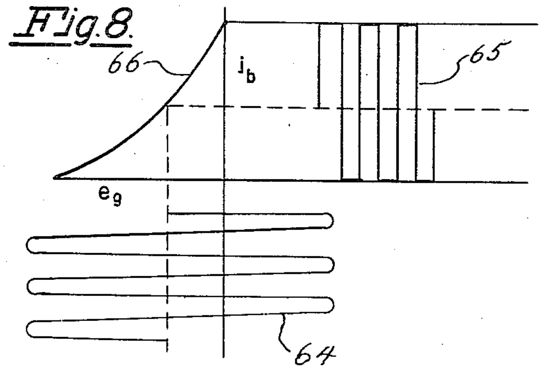

Other objects and features of the invention will be more fully understood from the following detailed description when read in conjunction with the drawing, in which:

Fig. 1 shows a schematic sketch of the invention;

Figs. 2, 3, and 4 show waveforms of the input and output signals of the circuit of Fig. 1, when the phase of the continuous waveform signal is the same as the phase of the applied amplitude modulated signal;

Figs. 5, 6, and 7 show waveforms of the input and output signals of the circuit of Fig. 1 when the phase of the continuous waveform signal is different from the phase of the applied amplitude modulated signal;

Fig. 8 is a diagram illustrating the relationship between the continuous waveform applied to a given one of the triodes and the resultant plate current flow in the said given triode; and Fig. 9 is a schematic sketch of another form of the invention.

Referring now to Fig. 1, the two triodes 10 and 11 are connected together in series-arrangement such that the anode 12 of triode 11 is connected to the cathode 13 of triode 10. The plate voltage supply 14 is connected across the cathode 15 of triode 11 and the anode 16 of triode 10 through the plate load resistor 17. Battery 70 and resistor 71 provide bias for grid 26.

Resistors 18 and 19 form a D.-C. voltage divider across the plate voltage supply 14. This voltage divider provides the proper bias for the control grid 24 of triode 10, which is connected to a point 27 on the voltage divider. What constitutes proper bias will be discussed in more detail later. An input signal represented generally by the waveform of Fig. 2, and which comprises a carrier signal whose amplitude is modulated by an intelligence-bearing signal, is supplied from the input signal source 23 to the control grid 24 of the triode 10. A continuous wave signal represented by the waveform of Fig. 3, and whose frequency and phase are the same as the frequency and phase of the carrier signal of the waveform of Fig. 2, is supplied to the control grid 26 of triode 11 from the source 25. Synchronizing means 28 is provided to maintain the desired phase and frequency relationship between the continuous wave of Fig. 3 and the input signal of Fig. 2. It is to be noted that the phase of the carrier signal may be different from the phase of the said continuous waveform by varying amounts depending on the result desired. This will be discussed in more detail later. Assume that in the present discussion the phases of the continuous waveform and the carrier signal are the same, as is shown in Figs. 2 and 3. The grid 26 of the tube 11 is biased in such a degree, and the peak-to-peak amplitude of the continuous wave supplied to the grid 26 of tube 11 is of such a value, that a negative excursion of said continuous wave will drive the potential of grid 26 well below plate current cut-off, thus cutting off tube 11 and preventing any plate current flow through either tube 11 or tube 10. Thus, there will be no output signal produced across the load resistor 17.

More specifically, in Figs. 2 and 3 it can be seen that during the negative excursion of the continuous wave of Fig. 3 as, for example, half cycle 34 which occurs during time interval $t_1$—$t_2$, there will be no output signal produced during the corresponding time interval, as indicated by the output waveform shown in Fig. 4. However, when the continuous waveform of Fig. 3 has a positive excursion, as illustrated, for example, by the half cycle 31 of Fig. 3, the potential of the control grid 26 of tube 11 will tend to become more positive than the cathode 15 potential, but will be limited to the cathode 15 potential due to the grid current the grid 26 will draw. Under these conditions the tube 11 will become conductive, thus permitting conduction through the tube 10. For example, under these conditions, the signal represented by the half cycle 30 of Fig. 2 will produce an output signal across the resistor 17 of Fig. 1, as represented by the half cycle 63 of Fig. 4.

The effect of the positive and negative excursions of the continuous waveform supplied to tube 11 is graphically represented in Fig. 8, which shows the curve 66 of the plate current, $I_b$, of the triode 11 (Fig. 1), versus control grid potential, $e_g$, of the triode 11, the continuous waveform 64 supplied to the control grid 26, and the resultant plate current represented by the waveform 65. It will be observed that the amplitude of the continuous waveform 64 is sufficiently great to produce a substantially rectangular output current 65 in the triode 11. Thus, the tube 11 functions essentially as a high speed switch, which is turned on and off as the continuous wave signal becomes positive or negative.

During the intervals of time that the potential of the grid 26 (Fig. 1) of the triode 11 is driven positive to cathode potential, the anode 12 potential will decrease to a predeterminable value. Since the cathode 13 of triode 10 is connected directly to the anode 12, it will also decrease to said predeterminable potential. The bias on the grid 24 preferably is selected so that the triode 10 will then be operating as a class "A" amplifier. During the time that the triode 10 is functioning as a class "A" amplifier, the input signal supplied to the control grid 24 will produce an output signal across the load resistor 17. Since the phases of the intput signal (Fig. 2) and the continuous waveform (Fig. 3) are the same, the input signal will produce an output signal consisting of a series of positive pulses. It is to be noted, however, that owing to the integrating capacitor 60, the signal actually appearing at the plate 16 will not be a series of pulses but a D.-C. signal whose amplitude varies with the average amplitude of the input signal applied to the control grid 24. The aforementioned D.-C. signal, which is represented by the dotted curve 67 of Fig. 4, is utilized by the load means 68 of Fig. 1.

Considering now, in greater detail, the action of the triodes 10 and 11 when they are in their conductive conditions, assume that a positive-going signal, as represented by the first half of the half cycle 30 of Fig. 2, is supplied to the grid 24 of the triode 10. Under these circumstances, the triode 10 will tend to conduct more plate current as the grid potential increases. However, some change in the potentials of the electrodes of triode 11 must occur to permit this additional current to flow. Since the potential of the grid 26 of triode 11 already is at cathode 15 potential, no additional plate current can be obtained by increasing the potential thereof. However, additional plate current can be obtained by an increase of the potential of the anode 12, which is what actually happens. As the potential of the grid 24 increases, the potential of the cathode 13 will also increase (but in a lesser amount) to permit an increase in the potential of the anode 12. These changes will occur until the potentials of the cathode 13 and anode 12 have become adjusted to permit the same plate current flow through both triodes while at the same time satisfying the operating characteristics of each tube. As the signal supplied to the grid 24 continues to increase, the changes in the potentials of the anode 12 and the cathode 13 will continue to change in the manner described above.

When the signal supplied to the grid 24 is negative-going (as for example the last half of the half cycle 30 of Fig. 2 which is coincident with a positive excursion of the continuous wave signal supplied to the grid 26 of the tube 11), the plate current in the tube 10 will tend to decrease. In order to cause a similar decrease in the plate current of tube 11, the potential of the anode 12 of tube 11 must decrease, since the potential of the grid 26 thereof is fixed. The potential of the cathode 13 must decrease by a similar amount. This decrease in the potentials of the cathode 13 of tube 10 and the anode 12 of tube 11 will continue until said potentials are readjusted to values such that the plate currents in the two triodes are the same, while at the same time satisfying the operating characteristics of the two triodes.

Referring now to Figs 5 and 6, there are shown waveforms of signals in which the phase of the continuous wave is different from the phase of the amplitude modulated signal. It is to be noted that the waveforms of Figs. 5, 6, and 7 (as well as the waveforms of Figs. 2, 3, and 4) are applicable to either the circuit of Fig. 1 or the circuit of Fig. 9. For purposes of discussion, however, the curves of Figs. 5, 6, and 7 will be described in relation to the circuit of Fig. 1.

Although varying degrees of difference of phase between the curves of Figs. 5 and 6 may exist, a phase difference of 90° has been selected for purposes of description. The waveform of Fig. 5 represents the amplitude modulated input signal supplied to the control grid 24 of tube 10, and the waveform of Fig. 6, whose phase is 90° removed from the phase of the waveform of Fig. 5, represents the continuous waveform supplied to the grid 26 of tube 11. The tubes 10 and 11 will be conductive during each positive excursion of the waveform of Fig. 6 as, for example, during the positive half cycle 36 which occurs during the time $t_3$—$t_4$. During this same time interval the input signal represented by the two quarter cycles 37 and 38 of the waveform of Fig. 5 will be supplied to the grid 24 of the triode 10 to produce a corresponding output signal across the load resistor 17 (Fig. 1), as represented by the waveform 39 of Fig. 7. As can be seen from Fig. 7, there is substantially no D.-C. component in this signal. Consequently, the integration of the signal by capacitor 60 will produce substantially zero output. It is to be noted that two amplitude modulated signals can thus be transmitted by carrier signals having the same frequency if the phases of said carrier signals are 90° removed from each other. In order to separate the two signals at the receiver, two synchronous detectors are required. A continuous wave having the same phase as the carrier of a first of the two modulated signals is supplied to a first of the two synchronous detectors to permit detection of said first signal only. No output is produced by the application of said second modulated signal to said first synchronous detector since the phase of the carrier signal thereof is 90° removed from the phase of the continuous waveform supplied thereto. Similarly, a second detector may be utilized to detect only the second amplitude modulated signal, while at the same time functioning to block out said first modulated signal.

Referring now to Fig. 9, there is shown another embodiment of the invention, in which the amplitude modulated signal is supplied from the source 44 to the control grid 43 of the lower triode 40, and in which the unmodulated continuous wave is supplied from the source 45 to the control grid 42 of the upper triode 41. Synchronizing means 29 is provided to maintain a desired phase relation between the signal supplied from source 45 and from source 44. The plate supply 46 is connected across cathode 52 of triode 40 and anode 51 of triode 41 through plateload resistor 47 to supply plate potential to both triodes. The voltage divider consisting of resistor 48 and resistor 49 is connected across the plate supply 46. The battery 72 and the resistor 73 function to supply biasing potential to the grid 43. The point 50 on the voltage divider is connected to the control grid 42 of the tube 41 and functions to provide said grid 42 with the proper bias. There is considerable discretion in the choice of the potential supplied to the control grids 42 and 43. The following conditions must be met: When a negative half cycle of the continuous wave is supplied to the grid 42, the plate current of the tube 41 should thereby be substantially cut off. When a positive half cycle of the continuous waveform is supplied to the grid 42, the plate current of the tube 41 should thereby be driven substantially to saturation. When the plate current of the tube 41 is driven to saturation the triode 40 should, in the absence of an input signal supplied to the grid 43 thereof, be preferably operating as a class "A" amplifier. Utilization means 55 is coupled to a convenient point, such as point 56, in the anode circuit of triode 41. Capacitor 61 performs the function of integrating the output signal appearing at the point 56.

The operation of the circuit of Fig. 9 will now be described. In accordance with the conditions set forth above, the continuous wave supplied to the control grid 42 of the triode 41 is of a magnitude such that the negative excursions thereof will drive the potential of the control grid 42 sufficiently negative as to substantially cut off plate current flow, and the positive excursions of said continuous wave would (if no grid current were drawn) drive the potential of the control grid 42 well above the cathode 54 potential. Thus, the tube 41 functions as a switch which is turned on and off with the positive and negative excursions of the continuous wave supplied to the grid 42 thereof. When the plate current of the triode 41 is cut off there will be no plate current flowing in the tube 40 either, since the two tubes are connected in series. Appreciable plate current will flow in the triodes 41 and 40 only during the positive excursion of the continuous wave.

Assume that during the time the positive half cycle of the continuous wave is being supplied to the grid 42 a positive-going input signal is supplied from source 44 to the control grid 43 of the tube 40. Such an input signal will increase the plate current through the tube 40, thus tending to decrease the potential of the anode 53 thereof. A decrease of the anode 53 potential will tend to decrease the potential of the cathode 54 of the triode 41, which will, in turn, decrease the grid 42 potential. The plate current of the triode 41 will thus be increased, which will lower the potential of the plate 51 due to the increased current flow through the resistor 47 across which the output signal is taken. These various potentials will readjust until the operating characteristics of both tubes are satisfied under the increased plate current therethrough.

If, during the time a positive half cycle of the continuous wave is being supplied to the grid 42 of tube 41, a negative-going signal is supplied to the control grid 43 of triode 40, the plate current in the triode 40 will decrease, thus causing the potential of the anode 53 thereof to increase. The plate current of the triode 41 must also decrease by an amount equal to the decrease of the plate current of triode 40.

Consequently, in order to satisfy the characteristics of the tube 41, the plate-to-cathode potential of the triode 41 must decrease, since the potential of the grid 42 remains substantially at cathode 54 potential. The potential drop across the load resistor 47 will also decrease, due to the decrease in current therethrough, thus increasing the absolute potential of the plate 51 of triode 41. It will be noted the decrease in potential drop across the resistor 47 and the tube 41 is equal to the increase in potential drop across the tube 40.

Thus, it can be seen that the circuit is self-adjusting, in that the plate-to-cathode potentials of the tubes 40 and 41 will readjust to each new value of grid potential supplied to the grid 43 of the tube 40, so that the plate current, which must be the same in both triode 40 and triode 41, will be in accordance with the operating characteristics of each tube.

As mentioned hereinbefore, electronic valves other than triodes may be employed in the invention. For example, with the proper selection of circuit constants a transistor may be substituted for each of the triodes in the circuits of Figs. 1 and 9.

It will be apparent to those skilled in the art that other changes may be made in values of circuit constants and circuit arrangement without departing from the spirit or scope of the invention.

I claim:

1. A synchronous detector comprising a D.-C. voltage supply, a first triode and a second triode connected in series-arrangement with respect to said D.-C. voltage supply, said triodes each having a control grid, means for applying an amplitude modulated signal to the control grid of said first triode, and means for supplying to the control grid of said second triode a continuous wave signal whose amplitude is substantially constant and whose frequency is equal to the frequency of the carrier signal of said amplitude modulated signal and whose phase bears a predetermined relationship to the phase of said carrier signal, said second triode constructed and arranged to be responsive to said continuous wave signal to become conductive or nonconductive in accordance with the polarity of said continuous wave.

2. A synchronous detector in accordance with claim 1 comprising means for determining variations in the anode current of said triodes, and means for integrating the variations of said anode current.

3. A synchronous detector comprising a first electronic valve and a second electronic valve connected in series-arrangement, each of said electronic valves having control means for controlling the amount of electron current flowing therethrough, means for supplying an amplitude modulated signal to the control means of said first electronic valve, and means for supplying to the control means of said second electronic valve a continuous wave signal of substantially constant amplitude and whose frequency is equal to the frequency of the carrier signal of said amplitude modulated signal and whose phase bears a predetermined relationship to the phase of said carrier signal, said second electronic valve responsive to said continuous wave signal to become conductive or substantially non-conductive in accordance with the polarity of the said continuous wave signal.

4. A synchronous detector including a first electron discharge device and a second electron discharge device, each of said electron discharge devices comprising a cathode, an anode, and a grid, the cathode of said first electron discharge device being connected to the anode of said second electron discharge device, means for applying a unilateral voltage across the anode of said first electron discharge device and the cathode of said second electron discharge device, means for supplying an amplitude modulated signal to the grid of one of said electron discharge devices, and means for supplying to the grid of the other of said electron discharge devices a second signal whose frequency is equal to the frequency of the carrier signal of the amplitude modulated signal and whose phase bears a known and substantially constant relationship with the phase of said carrier signal, said other electron discharge device being constructed and arranged to conduct a maximum grid controlled anode current therethrough in response to the positive excursions of said second signal and constructed and arranged to become nonconductive in response to the negative excursions of said second signal.

5. A synchronous detector in accordance with claim 4 comprising means for determining variations in the anode current of said triodes, and means for integrating the variations of said anode current.

6. A detector means including a first electron discharge device and a second electron discharge device, each of said electron discharge devices comprising a cathode, an anode, and a grid, the cathode of said first electron discharge device being connected to the anode of said second electron discharge device, means for applying a unilateral voltage across the anode of said first electron discharge device and the cathode of said second electron discharge device, means for supplying an amplitude modulated signal to the grid of said first electron discharge device, means for supplying to the grid of the second of said electron discharge devices a second signal whose frequency is equal to the frequency of the amplitude modulated signal and whose phase bears a known and substantially constant relationship with the phase of said amplitude modulated signal, said second electron discharge device constructed and arranged to conduct a maximum grid controlled anode current therethrough in response to the positive excursions of said second signal and constructed and arranged to become nonconductive in response to the negative excursions of said second signal and means for integrating the anode current flow in said first electron discharge device.

7. A synchronous detector including a first electron discharge device and a second electron discharge device, each of said electron discharge devices comprising a cathode, an anode, and a grid, the cathode of said first electron discharge device being connected to the anode of said second electron discharge device, plate supply means for supplying a potential across the cathode of said second electron discharge device and the anode of said first electron discharge device, means for supplying an amplitude modulated signal to the grid of said second electron discharge device, and means for supplying to the grid of said first electron discharge device a second signal whose frequency is equal to the frequency of said modulated signal and whose phase bears a predetermined relationship to the phase of said modulated signal, said first electron discharge device constructed and arranged to conduct a maximum grid controlled anode current therethrough in response to the positive excursions of said second signal and constructed and arranged to become nonconductive in response to the negative excursions of said second signal.

8. A synchronous detector in accordance with claim 7 comprising means for determining variations in the anode current of said triodes, and means for integrating the variations of said anode current.

9. A synchronous detector comprising a D.-C. voltage supply, a first triode and a second triode connected in series with respect to said D.-C. voltage supply such that the positive terminal of said D.-C. voltage supply is presented to said first triode, said first and second triodes each comprising a control grid, means for supplying a continuous wave signal of substantially constant amplitude to the control grid of said second triode, said second triode responsive to said continuous wave signal to alternately become conductive and substantially non-conductive in accordance with the polarity of said continuous wave signal, means for applying a first biasing potential to the control grid of said second triode, means for applying a second biasing potential to the control grid of said first triode, said first and second biasing potentials having values that when said second triode is in its conductive condition the said first triode will be operating substantially as a class "A" amplifier, means for applying an input signal to the grid of said first triode, and means for maintaining a predetermined phase relationship between said input signal and said continuous wave signal.

10. A synchronous detector in accordance with claim 9 comprising means for determining variations in the anode current of said triodes, and means for integrating the variations of said anode current.

11. Detector means including a first triode and a second triode, each of said triodes comprising a cathode, an anode, and a control grid, the cathode of said first triode being connected to the anode of the said second triode, means for applying a D.-C. voltage across the anode of said first triode and the cathode of the second triode, means for supplying a continuous wave signal of substantially constant amplitude to the control grid of said first triode, said first triode responsive to said continuous wave signal to alternately become conductive and substantially nonconductive in accordance with the polarity of said continuous wave signal, means for applying a first biasing potential to the control grid of said second triode, means for applying a second biasing potential to the control grid of said first triode, said first and second biasing potentials having values such that when said first triode is in its conductive condition the said second triode will be operating substantially as a class "A" amplifier, means for applying an input signal to the control grid of said second triode, and means for maintaining a predetermined phase relationship between said input signal and said continuous wave signal.

12. A synchronous detector including a first electron discharge device and a second electron discharge device, each of said electron discharge devices comprising a cathode, an anode, and a control grid, the cathode of said first electron discharge device being connected to the anode of said second electron discharge device, means for applying an unilateral voltage across the anode of said first electron discharge device and the cathode of said second electron discharge device, means for supplying a continuous wave signal to the control grid of one of said electron discharge devices, said one of said electron discharge devices being responsive to said continuous wave signal to alternately become conductive and non-conductive in accordance with the polarity of said continuous wave signal, means for applying a first biasing potential to the control grid of said second electron discharge device, means for applying a second biasing potential to said control grid of said first electron discharge device, said first and second biasing potentials having values that when said one of said electron discharge devices is in its conductive condition the other of said electron discharge devices will be operating as a class "A" amplifier, means for applying an input signal to the grid of said other electron discharge device, and means for maintaining a predetermined phase relationship between said input signal and said continuous wave signal.

13. A synchronous detector in accordance with claim 12 comprising means for determining variations in the anode current of said electron discharge devices and means for integrating the variations of said anode current.

14. A synchronous detector comprising a D.-C. voltage supply, a first electronic valve and a second electronic valve connected in series-arrangement with said D.-C. voltage supply, said first and second electronic valves each comprising a control means for controlling the electron current flowing therethrough, means for supplying a continuous wave signal of substantially constant amplitude to said first electronic valve, said first electronic valve responsive to said continuous wave signal to alternately become conductive and substantially non-conductive in accordance with the polarity of said continuous wave signal, means for applying to said control means of said first and second electronic valves biasing potentials having values such that when said first electronic valve is in its conductive condition and said second electronic valve will be operating substantially within the extremities of its operating range, means for supplying an input signal to the control means of said second electronic valve, and means for maintaining a predetermined phase relationship between said input signal and said continuous wave signal.

15. A synchronous detector comprising a D.-C. voltage supply, a first electronic valve and a second electronic valve connected in series with respect to said D.-C. voltage supply such that the positive terminal of said D.-C. voltage supply is presented to said first electron valve, said first and second electronic valves each comprising a control means for controlling the electron current therethrough, means for supplying a continuous wave signal to said first electronic valve, said first electronic valve responsive to said continuous wave signal to alternately become conductive and nonconductive in accordance with the polarity of said continuous wave signal, means for applying to the control means of said first electronic valve a biasing potential having a value such that when said first electronic valve is in its conductive condition the said second electronic valve will be operating substantially within the extremities of its operating range, means for applying an input signal to the control means of said second electronic valve, means for maintaining a predetermined phase relationship between said input signal and said continuous wave signal, and means for integrating the electron current flowing through said first electron valve.

16. A synchronous detector comprising a D.-C. voltage supply, a first electronic valve and a second electronic valve connected in series with respect to said D.-C. voltage supply such that the positive terminal of said D.-C. voltage supply is presented to said first electronic valve, said first and second electronic valves each comprising a control means, means for supplying a continuous wave signal to the control means of said second electronic valve, said second electronic valve responsive to said continuous wave signal to alternately become conductive and nonconductive in accordance with the polarity of said continuous wave signal, means for applying to the control means of said first electronic valve, a biasing potential having a value such that when said second electronic valve is in its conductive condition the said first electronic valve will be operating substantially within the extremities of its operating range, means for applying an input signal to the control means of said first electronic valve, and means for maintaining a predetermined phase relationship between the said input signal and said continuous wave signal.

References Cited in the file of this patent

UNITED STATES PATENTS

| | | |
|---|---|---|
| 1,986,597 | Nyman | Jan. 1, 1935 |
| 2,144,226 | Nyman | Jan. 17, 1939 |
| 2,632,046 | Goldberg | Mar. 17, 1953 |